United States Patent
Mardkha

(10) Patent No.: US 9,852,320 B2
(45) Date of Patent: Dec. 26, 2017

(54) SYSTEM FOR TRACKING ITEMS STORED IN A SAFE

(71) Applicant: Michael M. Mardkha, New York, NY (US)

(72) Inventor: Michael M. Mardkha, New York, NY (US)

(*) Notice: Subject to any disclaimer, the term of this patent is extended or adjusted under 35 U.S.C. 154(b) by 0 days.

(21) Appl. No.: 15/421,597

(22) Filed: Feb. 1, 2017

(65) Prior Publication Data

US 2017/0228569 A1   Aug. 10, 2017

Related U.S. Application Data

(60) Provisional application No. 62/291,339, filed on Feb. 4, 2016.

(51) Int. Cl.
*G08B 13/14* (2006.01)
*G06K 7/10* (2006.01)
*G08B 13/24* (2006.01)

(52) U.S. Cl.
CPC ..... *G06K 7/10425* (2013.01); *G08B 13/2451* (2013.01); *G06K 7/10356* (2013.01)

(58) Field of Classification Search
CPC .......................... G08B 13/14; G08B 13/2445; G08B 13/2451; G08B 13/2468; G08B 13/2471; G08B 13/08; G08B 25/10; G06K 7/10316; G06K 2017/0051; G06K 7/10346; G06K 7/10356; G06K 7/10009; G06Q 10/087
USPC ... 340/10.1, 10.3, 10.4, 572.1, 572.4, 572.7; 235/375, 385, 492, 439, 430
See application file for complete search history.

(56) References Cited

U.S. PATENT DOCUMENTS

| | | | |
|---|---|---|---|
| 8,692,654 B2 * | 4/2014 | Rimai | G06K 19/07327 340/10.1 |
| 2007/0222604 A1 * | 9/2007 | Phipps | G06K 7/0008 340/572.7 |
| 2009/0020601 A1 * | 1/2009 | Woodbury | G06Q 10/087 235/375 |
| 2011/0315766 A1 * | 12/2011 | Phillips | G06K 7/10316 235/385 |
| 2013/0251483 A1 * | 9/2013 | Kobayashi | C12M 23/50 414/282 |
| 2016/0117530 A1 | 4/2016 | Roth | |
| 2016/0203687 A1 * | 7/2016 | Lee | G08B 25/10 340/545.2 |

OTHER PUBLICATIONS

D.C. Wyld, "24-Karat Protection: RFID and Retail Jewelry Marketing," International Journal of UbiComp (IJU), vol. 1, No. 1, Jan. 2010, pp. 1-14.
"RFID in Jewelry Management System", White Paper, Ver 1.0,Iaito Edge Face Technology (Apr. 2009).

* cited by examiner

*Primary Examiner* — Hung T Nguyen
(74) *Attorney, Agent, or Firm* — Blank Rome LLP

(57) ABSTRACT

A radio-frequency identification ("RFID") system for tracking items stored in a safe. The RFID safe system may include at least a safe and an RFID system. An RFID antenna may be fixed inside the safe. For example, the RFID antenna may fixed on an inner surface of a door to the safe such that the RFID antenna sends and receives signals across multiple angles as the safe door opens and closes.

10 Claims, 21 Drawing Sheets

SYSTEM FOR TRACKING ITEMS STORED IN A SAFE

This application claims the benefit of U.S. Provisional Application No. 62/291,339, filed on Feb. 4, 2016.

TECHNICAL FIELD

The present invention relates generally to inventory tracking and security systems for valuable goods, and more specifically to radio frequency identification (RFID) technology used with a safe, where tags are placed on items intended to be stored in a safe.

BACKGROUND OF THE INVENTION

In recent times, wireless technology has paved the way for several new and useful applications in the field of electronics and communication. One of the important applications of wireless technology is radio-frequency identification ("RFID"). RFID systems are employed for various purposes such as object tracking, security, inventory control in retail stores, and the like.

RFID is a technology based on the wireless use of electromagnetic fields to transfer data, for the purposes of automatically identifying and tracking tags attached to objects. For the purposed of this discussion we will examine the Near Field RFID tags, their use and operating characteristics.

The basic RFID tag is composed of a small memory chip and an antenna coil manufactured on a thin layer of substrate material. The antenna acts as a transponder and when exposed to radio frequency electromagnetic radiation which will provide the necessary energy for the contents of the chip can be transmitted by the antenna. RFID tags generally have no power source. They are essentially non-responsive until exposed to sufficient "flux" of the radiation of appropriate frequency to activate and transmit the data stored on the chip.

The most common of the RFID systems use UHF frequencies and most countries have yet to agree on a single area of UHF spectrum. The antenna coil generally is a very basic directional antenna and that is sensitive to direction of the signals.

The introduction of RFID technology in many industries in the recent past has significantly improved the process of inventory management and security in a wide range of applications. However, there are many other industries which still have needs for effective inventory and security systems. A few such industries that can benefit from an effective RFID technology system are Jewelry and Gemstone dealers, Gun Dealers, Pharmacies, and those that handle sensitive documents management such as Defense Industry. There is therefore a need for an effective RFID system for tracking objects stored in a safe or vault.

SUMMARY OF THE INVENTION

The present invention relates to an RFID safe system. The RFID safe system of the present invention includes at least a safe or other secure storage container, a safe door, and an RFID system having an RFID antenna and an RFID reader. The safe has at least a safe chamber for storing objects, a plurality of inner surfaces, and a top outer surface of the safe. The safe door has at least an inner surface and an RFID antenna mounted to the inner surface. RFID antenna signals propagate out from the RFID antenna and into the safe chamber. The RFID antenna may be integrated with an RFID reader, and multiple RFID antennas may be mounted on the safe door. Alternatively, the RFID antenna and RFID reader may be in separate housings for example the RFID reader may be located on the exterior of the safe, the safe door, or located separately from the safe altogether.

DETAILED DESCRIPTION OF THE INVENTION

Figure 1:
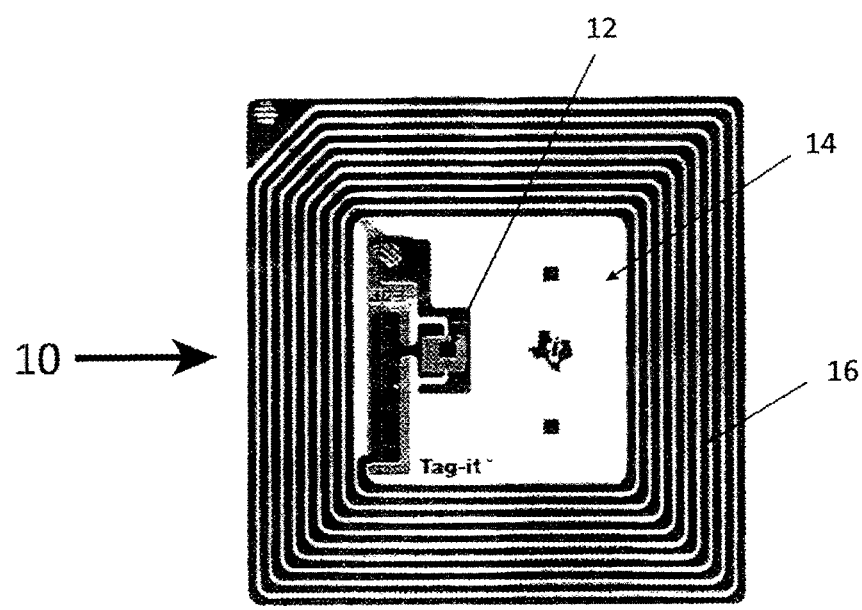
FIG. 1 illustrates components of a known RFID tag according to the prior art.
Figure 2:
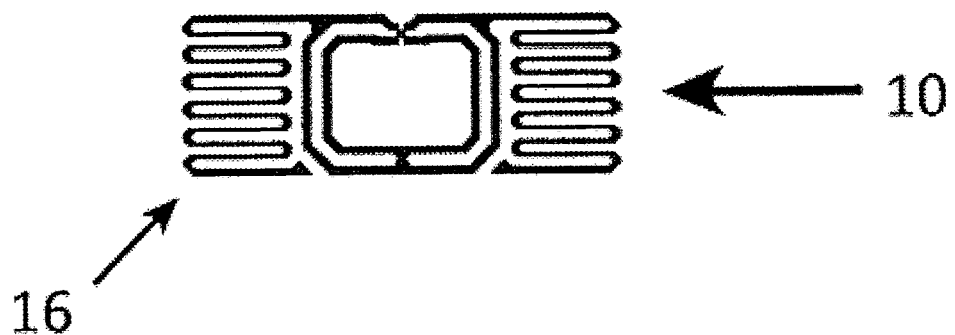
FIG. 2 illustrates a known RFID tag according to the prior art.
Figure 3:
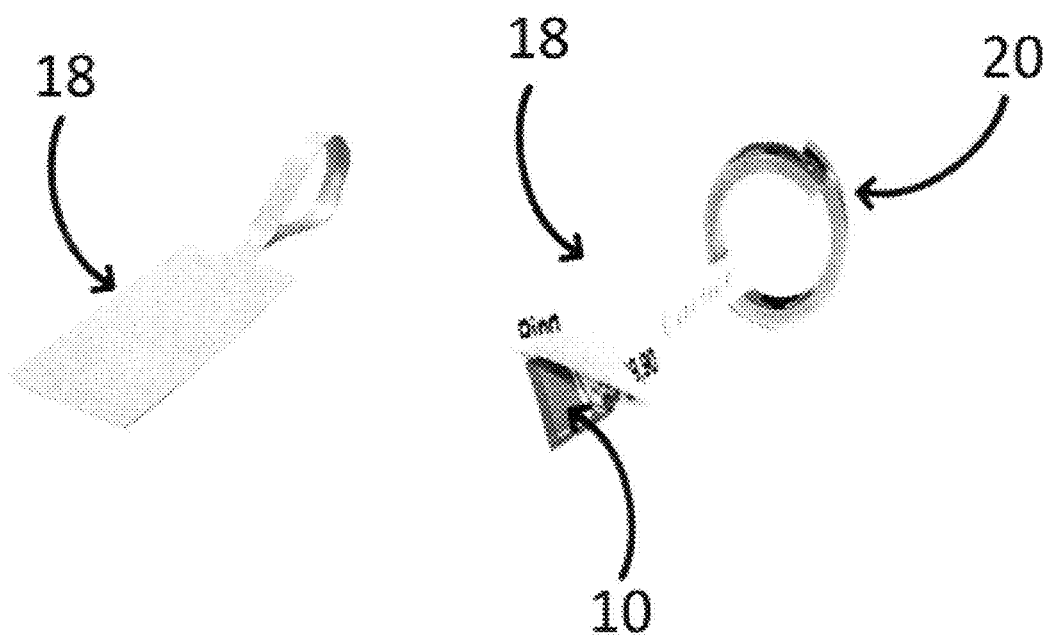
FIG. 3 illustrates an embodiment of an RFID tag according to the prior art.

FIG. 1 provides an example of an RFID tag 10 known in the art. The RFID tag 10 has several components, including a chip 12, a substrate 14, and a tag antenna 16. RFID tags can come in a number of shapes and sizes. For example, FIG. 2 illustrates a very small RFID tag 10 useful for attaching to small objects such as jewelry. The RFID tag 10 in FIG. 2 generally measures about one inch in length and can be affixed to, for example, a small box containing a valuable object (jewelry, gemstones, and the like). The RFID tag 10 may also be sandwiched in a small RFID tag cover 18, as illustrated in FIG. 3. In this embodiment, the RFID tag 10 sandwiched in RFID tag cover 18 may be affixed to a jewelry item 20.

Figure 4:
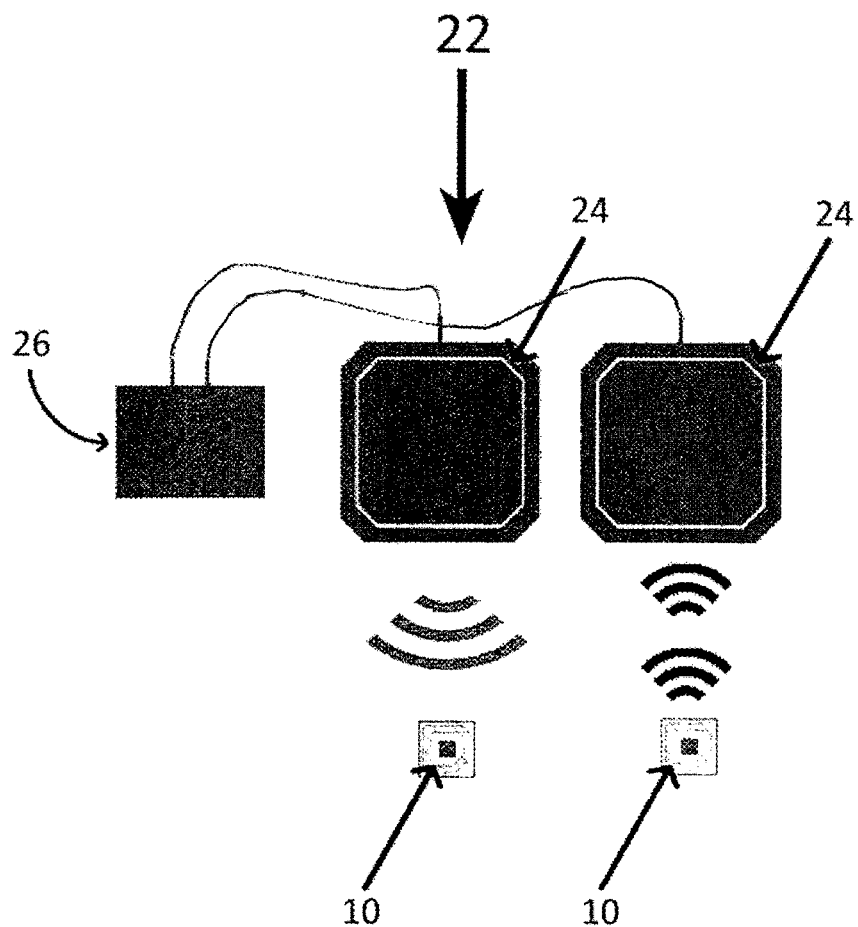
FIG. 4 illustrates an embodiment of an RFID system according to the prior art.

FIG. 4 illustrates the operation of a generic RFID system 22 known in the art. The RFID system 22 includes at least one RFID antenna 24, an RFID reader 26, and at least one RFID tag 10. Electrical components within the RFID reader 26 generate radio waves to activate the RFID tags 10 and then interprets the reflected data from the RFID tags 10 using one or more RFID antennas 24. While FIG. 4 depicts two RFID antennas 24, the RFID system may be implemented with one RFID antenna or more than two RFID antennas.

Figure 5:
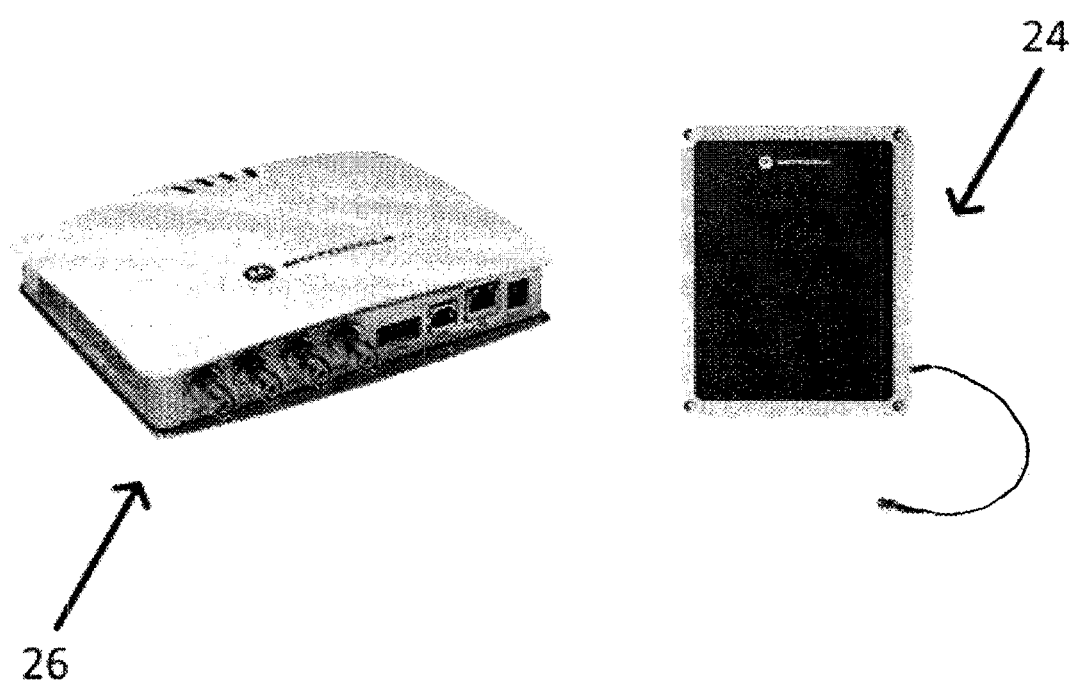
FIG. 5 illustrates an embodiment of an RFID reader and antenna according to the prior art.
Figure 6:
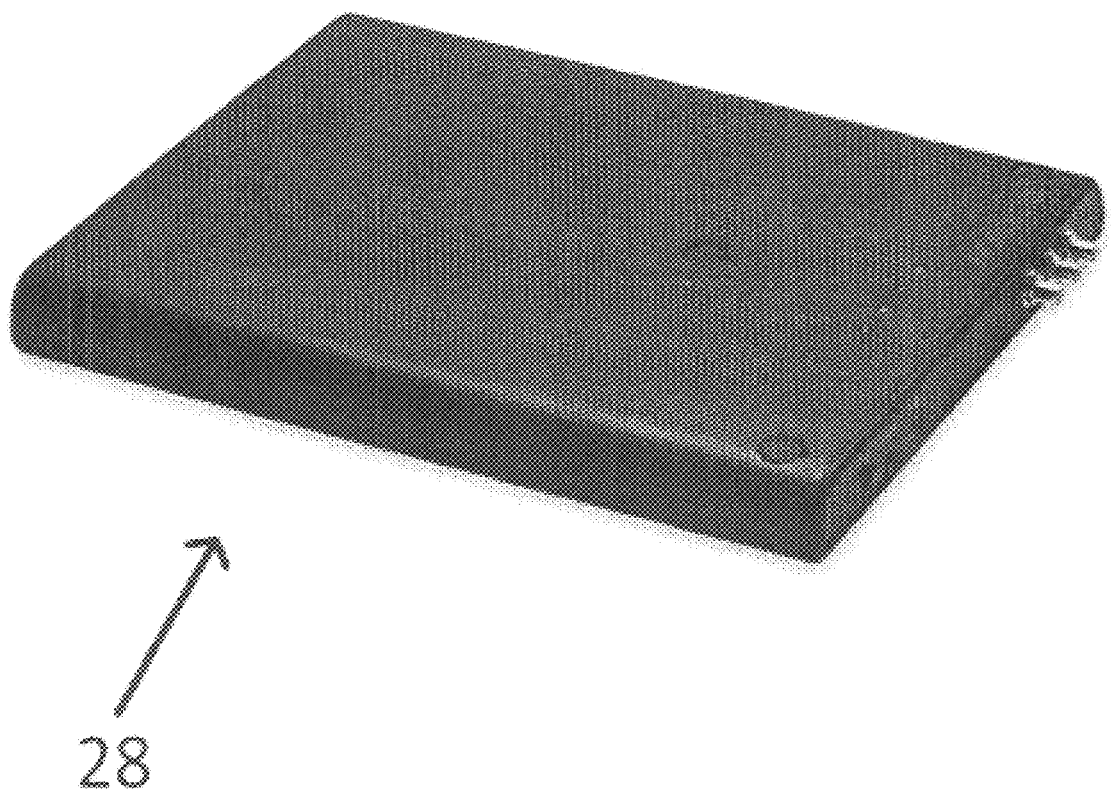
FIG. 6 illustrates an embodiment of an integrated RFID reader and antenna according to the prior art.

Just like RFID tags, the RFID antennas 24 and RFID readers 26 also come in a variety of shapes and sizes for various applications. For example, FIG. 5 illustrates an embodiment of a known RFID system having separate housings for the RFID antenna 24 and the RFID reader 26. The RFID reader 26 connects to the RFID antenna 24 by a cable. Alternatively, as illustrated in FIG. 6, the RFID antenna 24 and RFID reader 26 may be contained within the same housing. More antennas may be added to the system as necessary.

RFID systems have several known problems that limit their effectiveness, including issues with activation and with alignment. The RFID tag antenna 16 acts as a transponder. When exposed to radio frequency electromagnetic radiation, which provides the necessary energy to activate the chip 12, the RFID tag 10 transmits through tag antenna 16 the contents contained on the chip 12. The amount of radiation or "flux" is directly impacts how well the RFID system operates. If not activated, the RFID tag 10 will be non-responsive since it does not have its own power source. The RFID antenna 24 and RFID reader 26 will not be able to read the RFID tag 10.

Figure 7:
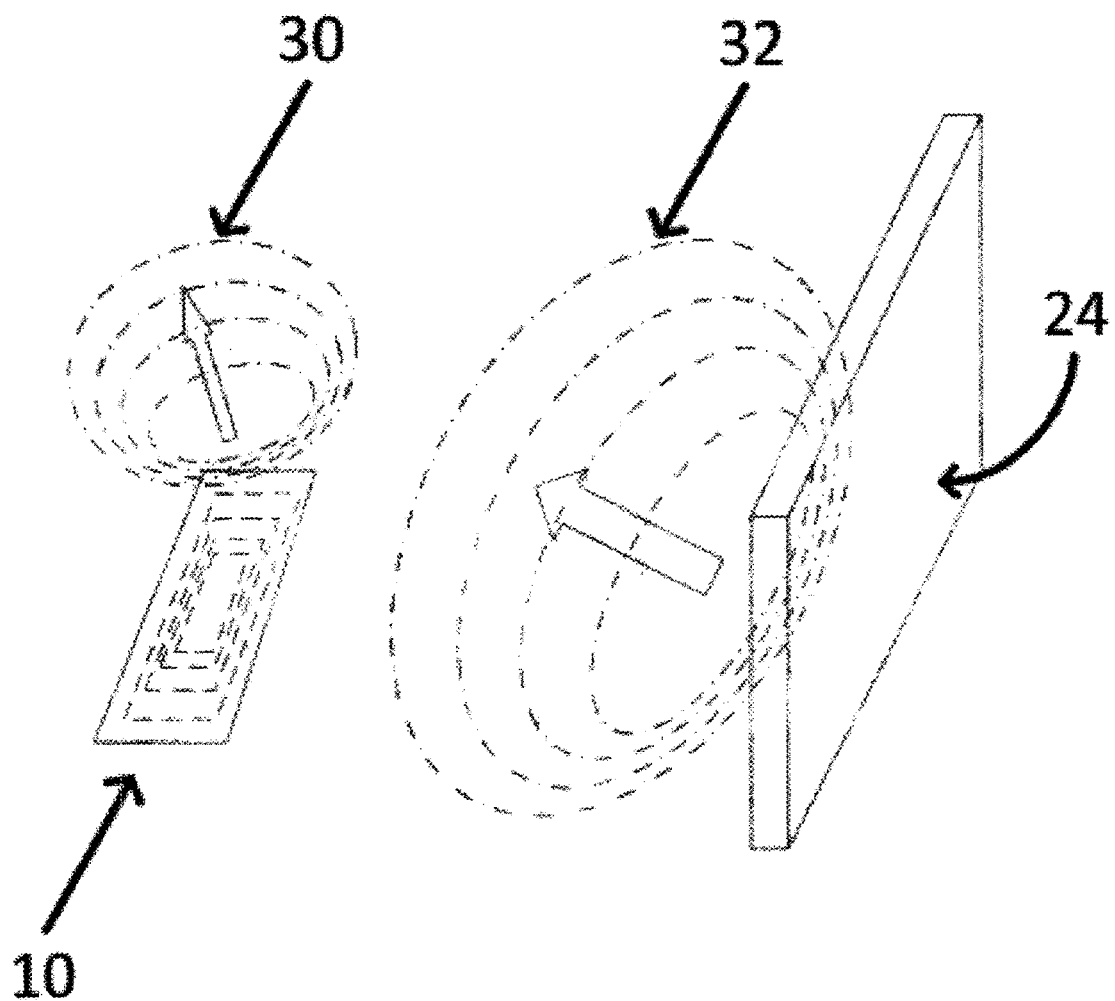
FIG. 7 illustrates directional wave propagation of an RFID tag and antenna according to the prior art.

The alignment of the RFID tag 10 to the RFID antenna signal 32 is critically important to the proper operation of the RFID system 22. When items that are equipped with RFID tags 10 are loosely placed together in a container, there is no guarantee that an RFID reader 26 will detect all RFID tags 10, depending on the alignment of the RFID tag 10 to the RFID antenna 24. FIG. 7 illustrates an embodiment where an RFID tag 10 is and the RFID antenna 24 are not aligned, resulting in the RFID tag signal 30 and the RFID antenna signal 32 propagating in different directions.

Figure 8:
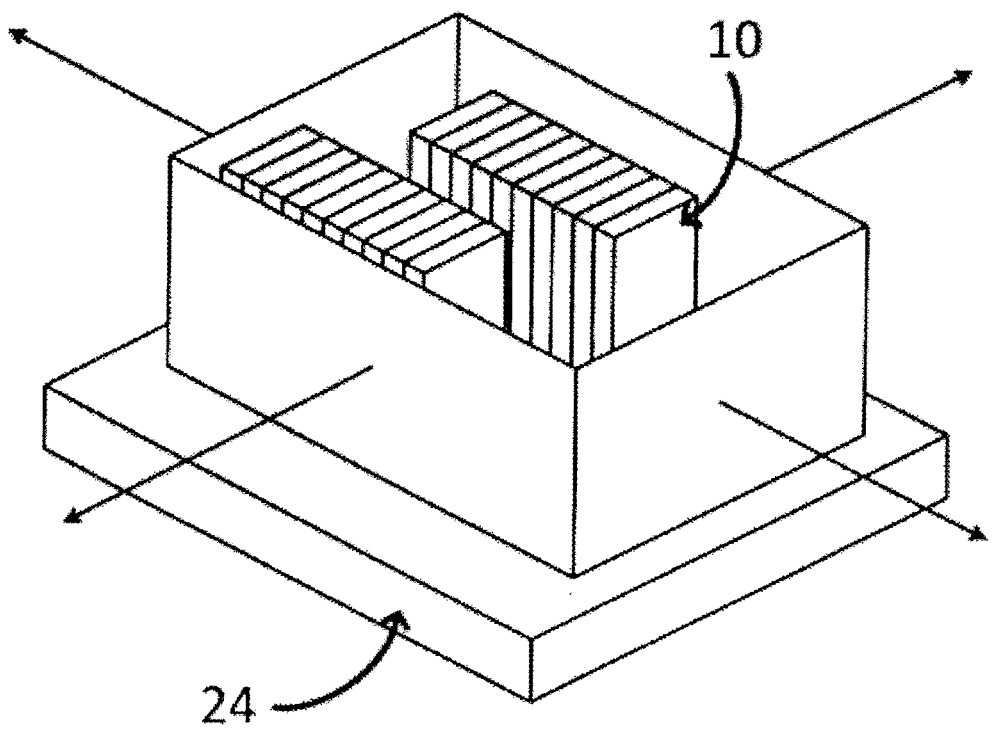
FIG. 8 illustrates an RFID system according to the prior art.

Typically, users need to move a container having multiple RFID tags 10 in several axes so that every RFID tag 10 will have an opportunity to be aligned properly with the RFID antenna 24. Traditionally, the use of a RFID antenna 24 involves the RFID antenna 24 being mounted stationary while items with RFID tags 10 are moved around in front of the RFID antenna 24 in order for the RFID tags to be aligned and read. This is illustrated in FIG. 8.

Figure 9:
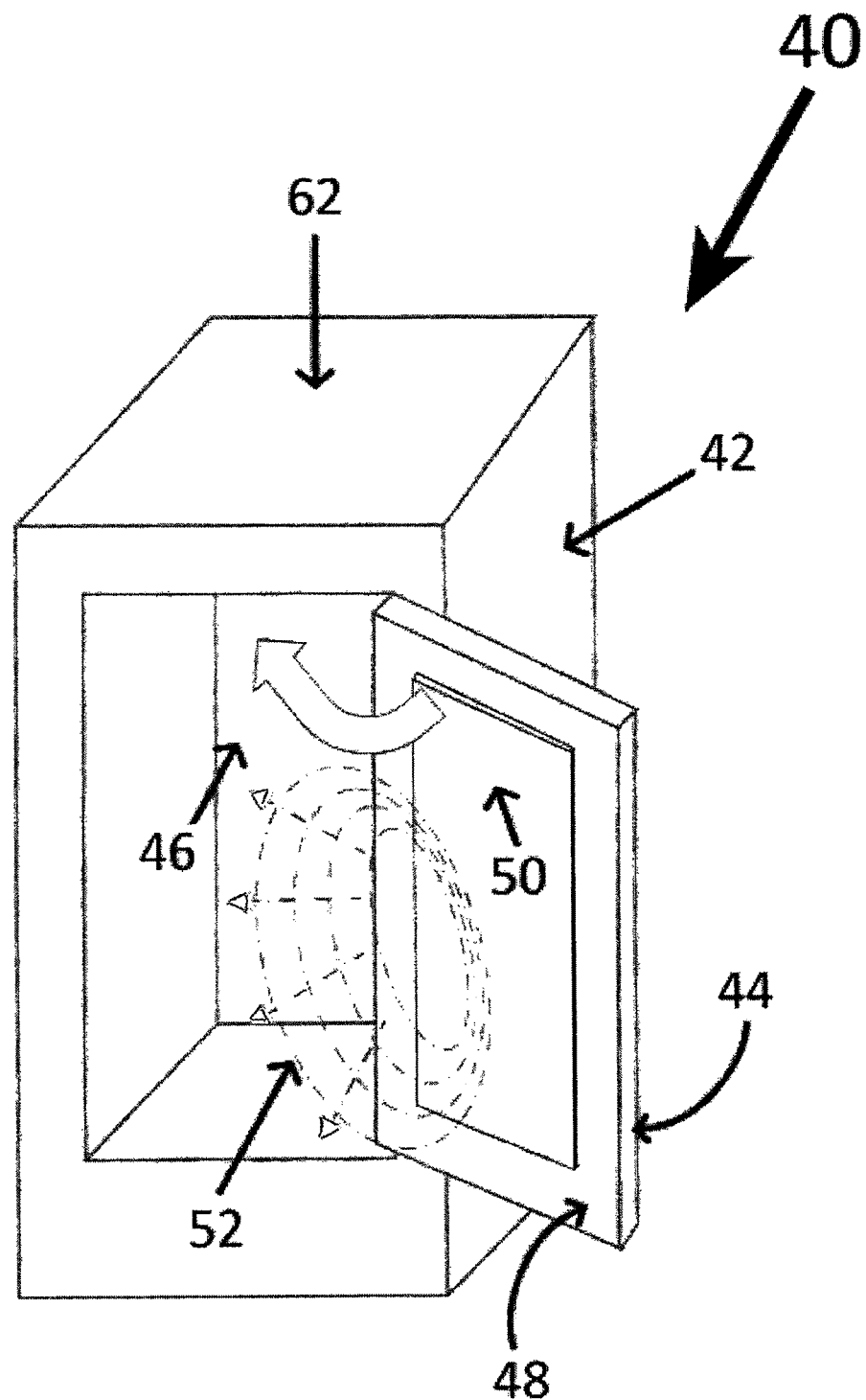
FIG. 9 illustrates an RFID safe system according to an embodiment of the present invention.

FIG. 9 illustrates an exemplary embodiment of an RFID safe system 40 according to an exemplary embodiment of the present invention. The RFID safe system 40 includes at least a safe 42, a safe door 44, and an RFID system. The RFID system includes at least an RFID antenna 50 and an RFID reader (not pictured). The safe 42 includes at least a safe chamber 46 having a plurality of inner chamber surfaces, and a top surface of the safe. The safe door 44 includes at least an inner surface 48 of the safe door 44 with the RFID antenna 50 affixed to the inner surface 48. Antenna signals 52 propagate out from the RFID antenna 50 and into the safe chamber 46. A person of ordinary skill in the art would understand that RFID antenna 50 may be an integrated RFID antenna and reader, and would further understand that multiple RFID antennas 50 may be used. Alternatively, the RFID antenna and reader may be in separate housings, and the RFID reader may be located inside the safe 42 or outside the safe. In the embodiment in FIG. 9, the RFID reader is not pictured but is understood to be included in the RFID safe system 40. Additionally, objects with RFID tags 54 are not shown in FIG. 9.

Figure 10:
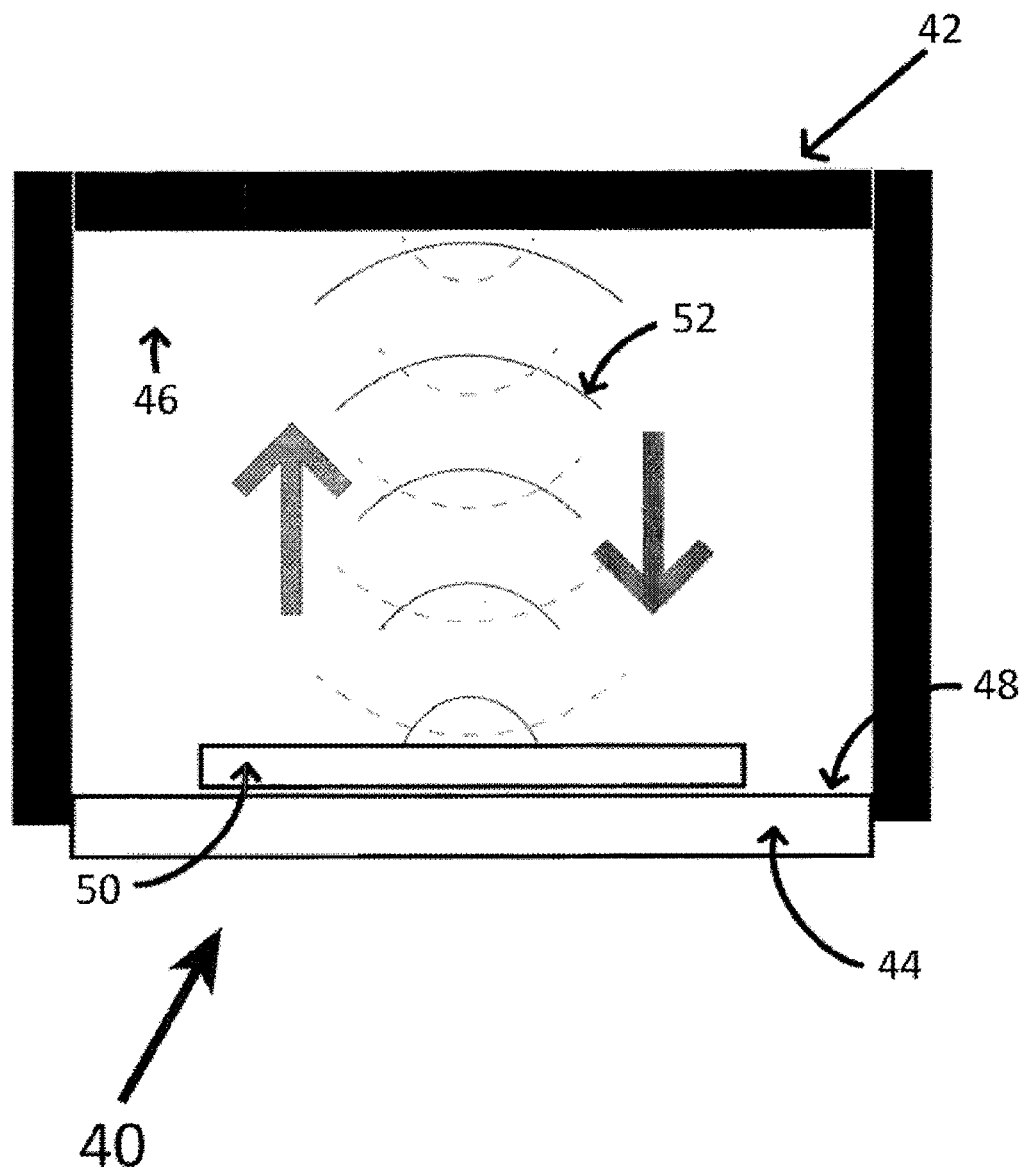
FIG. 10 illustrates a top view of the RFID safe system of FIG. 9, according to an embodiment of the present invention.
Figure 11:
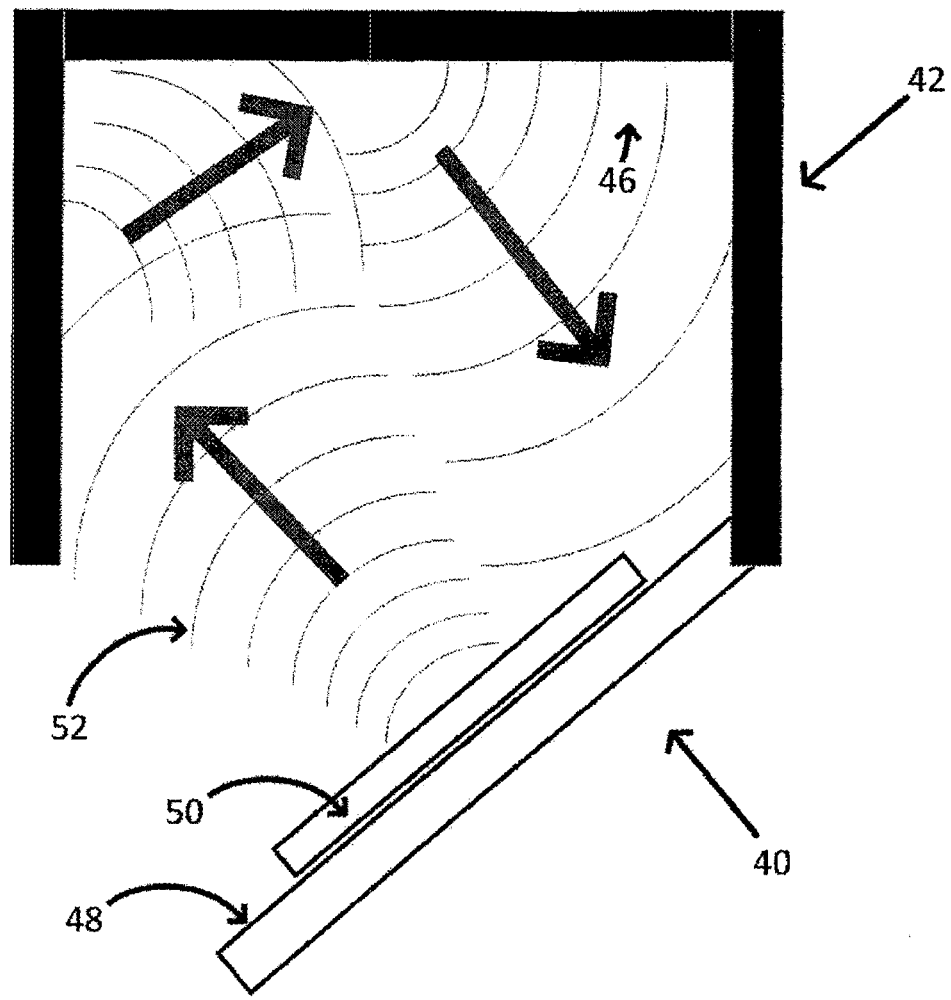
FIG. 11 illustrates a top view of the RFID safe system of FIG. 9, according to an embodiment of the present invention.

FIG. 10 is a top view of the RFID safe system 40 of FIG. 9, with safe door 44 in the closed position. RFID antenna signals 52 propagate inside safe chamber 46 as shown. FIG. 11 is a top view of the RFID safe system 40 of FIG. 9, this time with safe door 44 open at an angle of approximately 45 degrees. As can be seen, RFID antenna signals 52 propagate inside safe chamber 46 and reflect off each of the inner surfaces of the safe 42.

In alternative embodiments, the RFID antenna 50 may be fixed to an inner chamber surface inside the safe chamber 46. Furthermore, a plurality of RFID antennas 50 may be fixed to the inner chamber surface, or to a plurality of inner chamber surfaces inside the safe chamber.

The RFID safe system 40 presents a number of benefits over known systems. First, the safe 42 is an excellent echo chamber for radio wave signals. The RFID antenna signals 52 reflect off the surfaces of the safe chamber 46 and substantially increase the flux density in the safe chamber 46. This significantly improve activation of the RFID tags 54. Simulations have shown an increase in flux density 70 of up to 30x.

Another major benefit results from the RFID antenna 50 being mounted on the inner surface 48 of the safe door 44. As the safe door 44 opens or closes, the direction of the RFID antenna signals 52 are swept across a geometric plane. Thus, as the safe door 44 opens or closes, the alignment of an RFID tag 54 and RFID antenna 50 changes significantly. This increases the probability of proper alignment and successful detection. Therefore, instead of the RFID tags needing to be intentionally moved in the known systems in order to increase the probability of alignment, the RFID safe system 40 of the present invention moves the RFID antenna 50 as the safe door 44 opens or closes.

Yet another benefit achieved by the present invention is a more uniform flux density 70 across all areas of the safe chamber 46 during a sweep, thus increasing the probability of detection for all RFID tags 54 regardless of location within the safe 42.

The benefits of the present invention have been quantified by a series of tests described below. The first test measured three parameters: 1) number of RFID tags found; 2) the time elapsed to find the number of RFID tags; and 3) the average read time per RFID tag.

Figure 12:
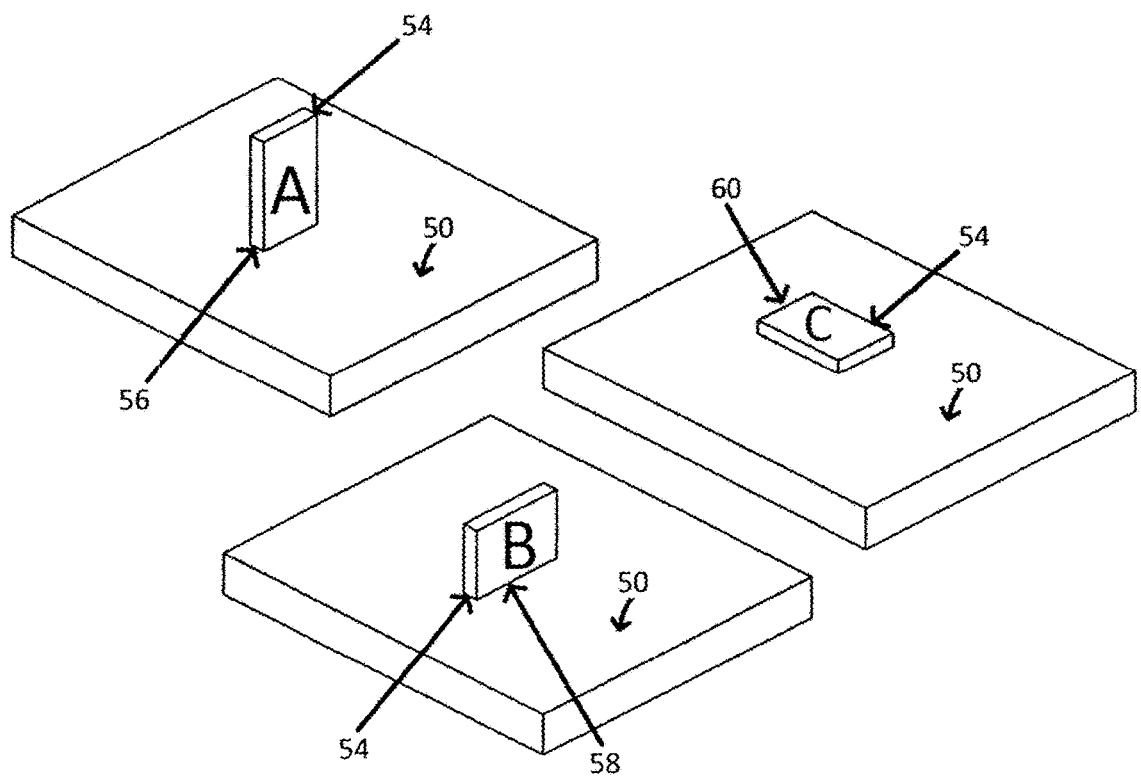
FIG. 12 illustrates RFID tag orientations used in tests of the present invention.

The first test involved placing RFID tags in plastic cases and bundling twenty-six RFID tags together. The bundles of RFID tags 54 were tested in three orientations as illustrated in FIG. 12: orientation A 56, orientation B 58, and orientation C 60. Testing was conducted both inside a safe and outside a safe with the same RFID antennas, RFID tag bundles, and RFID tag orientations. The first test used single-burst reads. The RFID antenna was in a static position.

The first test revealed that in single-burst reads, there was no significant difference between the number of RFID tags found inside a safe and outside a safe. Furthermore, the orientation of the RFID tag bundles appeared to have little significance. As expected with a stationary RFID antenna and stationary RFID tag bundles, rarely were all twenty-six tags read in a single burst.

The second parameter revealed substantial improvement in the test condition where the RFID tag bundles were placed inside a safe. The average time elapsed to find the number of RFID for orientation A improved from 1.07575 seconds to 0.1415 seconds, a 7.6× improvement. Similarly, orientations B and C showed 5.4× and 6.6× improvements, respectively. The variance of the data points decreased by similar factors, indicating a much higher flux density while operating inside the safe. The standard deviation numbers improved by almost 20×.

The third parameter also improved dramatically inside a safe. The average read time per RFID tag improved from only 21.25 tags per burst for orientation A outside of the safe, to 117.5 tags per burst inside the safe, a 5.5× improvement. RFID tag orientations B and C show similar improvements as well. This demonstrates further evidence of flux density being higher within the safe. This test was performed in a controlled environment with the RFID tags in close proximity to the RFID antenna and limited interference. In less ideal operational environments, the disparity between the two conditions (inside the safe vs. outside the safe) is expected to be significantly greater.

A second test used a continuous loop read cycle of 100 loops instead of a single-burst read. The second test considered the three parameters listed in test one, but further considered a fourth: the top read time of RFID tags per second. This parameter measured the maximum RFID tags per second the system was able to achieve in the test environment.

The second test showed that all RFID tags were eventually read, both inside and outside the safe, during the continuous loop reads. The orientation of the RFID tag bundles also did not have any impact as all tags were read in all three orientations.

Regarding parameter two, the time elapsed for finding the RFID tags improved significantly for the test condition inside the safe. The test resulted in improvements of 5×, 3.7× and 5.1× for RFID tag orientations A, B, and C, respectively. Additionally, the variance of the data points decreased by as much as 44×, likely attributable to a much higher flux density, and the standard deviation numbers improved by about 5× while operating inside the safe. For parameter three, improvements were 6.8×, 6.4× and 10.1× for RFID tag orientations A, B and C respectively, Parameter four, the top read time of RFID tags per second, improved by 4.4×, 3.5× and 6.9× for RFID tag orientations A, B, and C, respectively, while operating inside the safe. As with test one, test two was performed in a controlled environment with the RFID tags in close proximity to the RFID antenna and limited interference. In less ideal operational environments, the disparity between the two conditions (inside the safe vs. outside the safe) is expected to be significantly greater.

The tests were conducted with a stationary safe door. Significant gains are expected when the safe door is swept across a geometric plane as it opens or closes. A series of simulations described below demonstrate the improvements achieved by the present invention.

The simulations compared the operation of an RFID safe system to a generic RFID system currently employed. The RFID safe system included a metal safe with a door equipped with an RFID antenna, and the generic RFID system used a static (stationary) RFID antenna in empty space. The simulations employed a Finite Difference Time Domain numerical electromagnetism simulation, MEEP, to model the RFID antenna's emission process and subsequent propagation of electromagnetic (EM) waves within a model safe that represents the RFID safe system of the present invention. The particular software used was: Ardavan F. Oskooi, David Roundy, Mihai Ibanescu, Peter Bermel, J. D. Joannopoulos, and Steven G. Johnson, MEEP: A flexible free-software package for electromagnetic simulations by the FDTD method, Computer Physics Communications 181, 687-702 (2010). However, a person of ordinary skill in the art would understand that other simulation software may alternatively be used.

Figure 13:
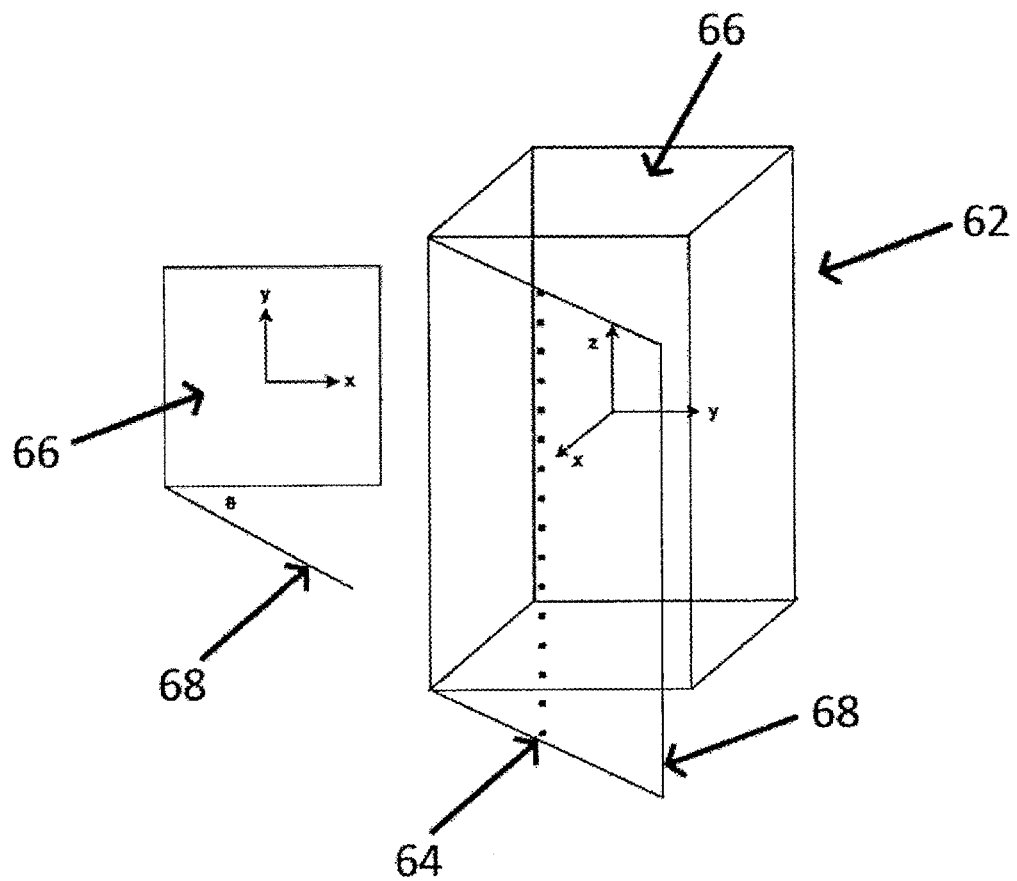
FIG. 13 is a schematic diagram of a model safe used to simulate the present invention.

FIG. 13 illustrates a schematic diagram of a model safe used to simulate the present invention. The model safe 62 is assumed to be metal, and well-approximated as a perfect conductor at the boundary conditions. The emitting RFID antenna is assumed to be a perfect oscillating electric dipole, and having a dipole axis 64 on the model safe door 68, as illustrated in FIG. 13. An X-Y plane can be seen in FIG. 13, viewed by looking down at a top surface 66 of the model safe 62.

The simulation used a constant dipole oscillation frequency equivalent to 900 MHz. In all simulations involving any time-averaging, samples were collected at more than ten times the frequency of the dipole emitter. All simulations used a total grid size of approximately 1×2×1 meters, where the model safe 62 is centered in all axes and has a total size of approximately 0.5×0.75×0.75 meters with a wall thickness of approximately 0.05 meter. The simulation region was bounded by a perfectly matched layer having a thickness of approximately 0.1 meter; effectively simulating a safe in vacuum with no nearby objects. The simulation used a resolution of 50×100×50 (i.e., a resolution of 50 per meter), and ran for a time of more than 150 periods of the wave.

Figure 14:
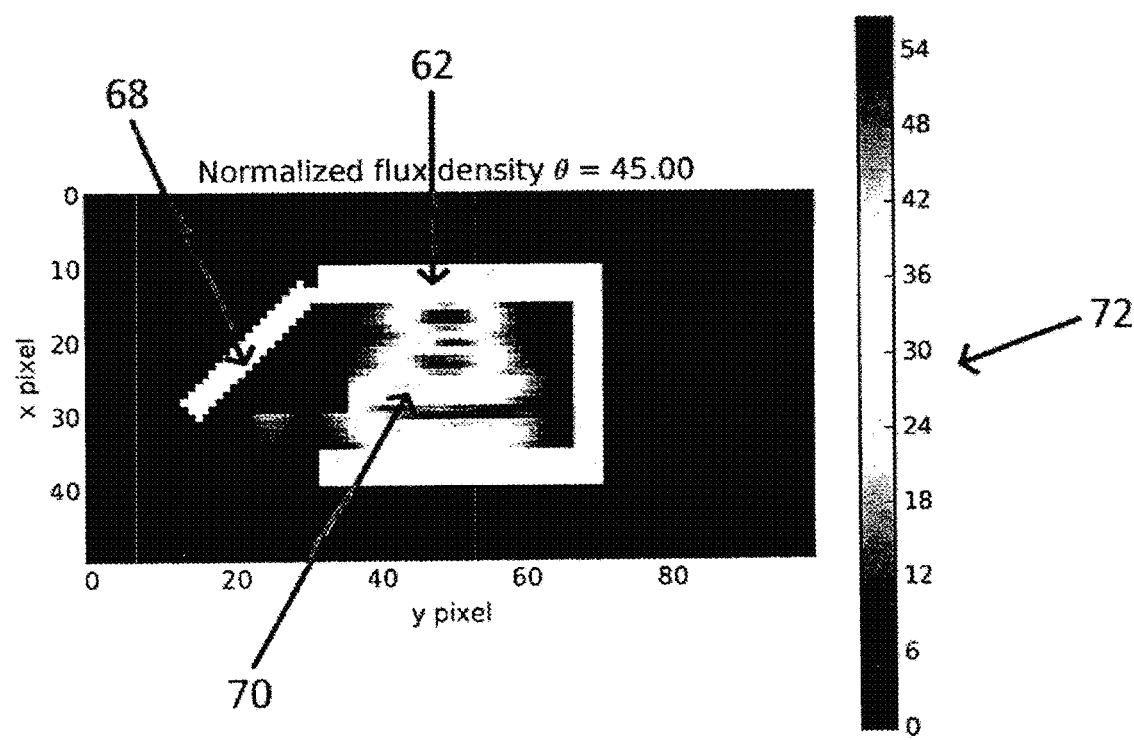
FIG. 14 illustrates a heat map of average flux on an X-Y plane, according to a simulation of the present invention.

The simulations demonstrate a definitive increase in maximal flux throughout the model safe 62 of the present invention, as compared to the control test. FIG. 14 illustrates a heat map of average flux in the safe on an X-Y plane in an exemplary embodiment. The model safe door 68 is open at approximately 45 degrees relative to the model safe 62. The flux is averaged over all Z-axis slices and across all time, at each X-Y pixel. That is, FIG. 14 illustrates a heat map of X-Y planes stacked in the Z-axis direction, and viewed from the top of the model safe 62 looking down the Z-axis. The flux density 70 is shaded according to the flux density legend 72. The flux density quantity shown is normalized by the per-pixel flux of the model control safe inside the model safe chamber. For example, the sum of this quantity over all X-Y coordinates within the safe chamber yields the ratio of total maximal flux of the simulation of the present invention compared to the total maximal flux of the model control safe. In FIG. 14, the RFID antenna is artificially obscured so that the color scale of the flux density 70 focuses on the area inside the model safe chamber. Nearly everywhere inside the model safe chamber the ratio is higher than 1, indicating a generally positive result.

Figure 15:
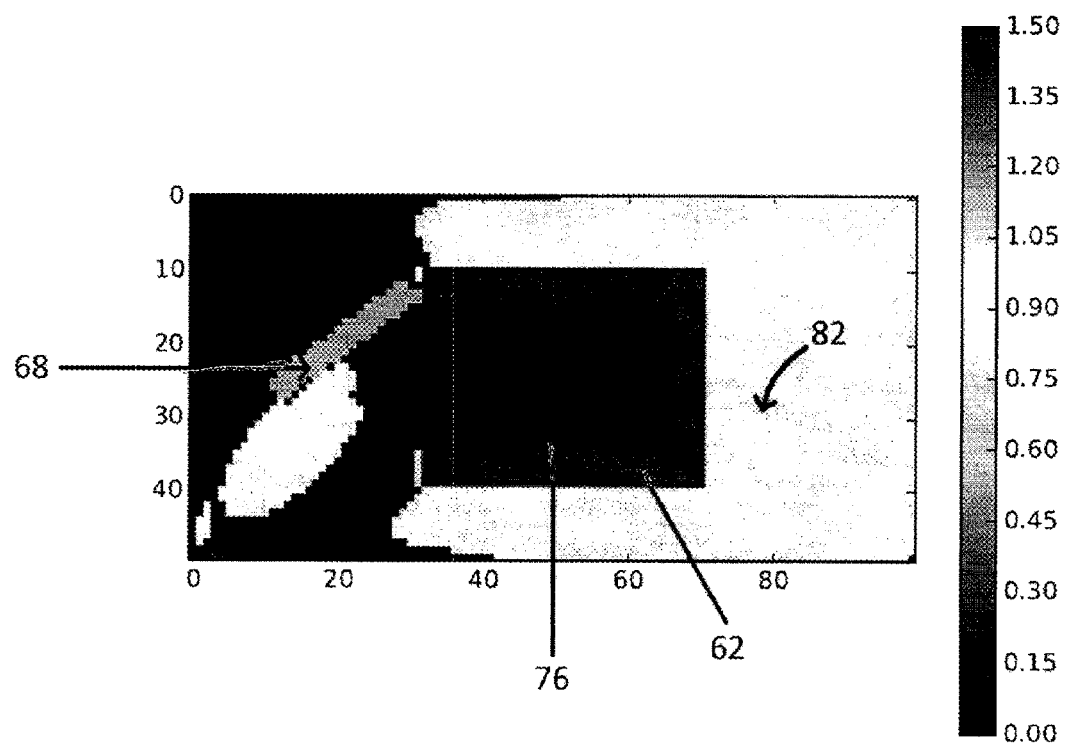
FIG. 15 illustrates deadzones, according to a simulation of the present invention.

FIG. 15 illustrates a colored map of deadzones within the model safe according to a simulation of the present invention. Blue areas 76 represent pixels where the Z-average of the model safe simulation contains more flux than the Z-average of the control simulation. Yellow areas 82 represent pixels where the Z-average of the model safe simulation contains less flux than the Z-average of the control simulation. FIG. 15 shows no deadzones inside the model safe simulation of the present invention.

Figure 16:
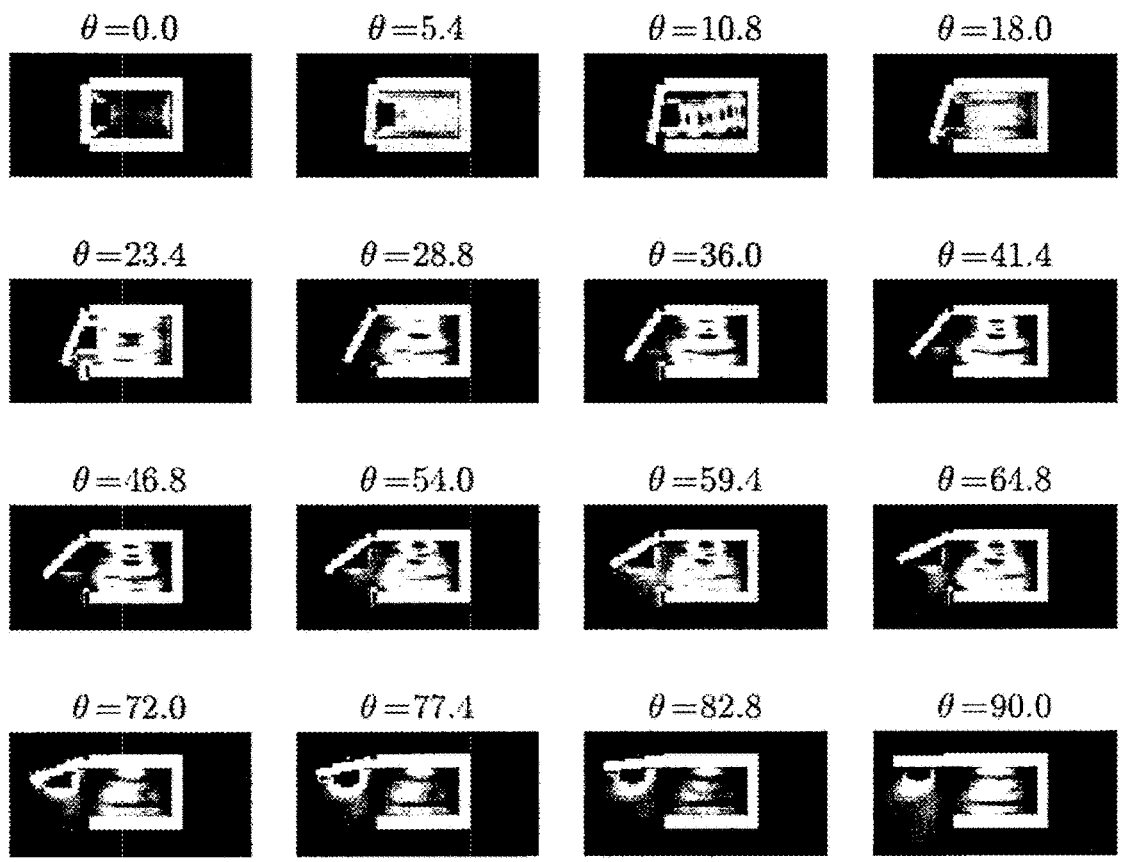
FIG. 16 illustrates maximum flux for various safe door opening angles, according to a simulation of the present invention.

FIG. 16 illustrates maximum flux gain for various model safe door opening angles, according to a simulation of the present invention. This figure gives a qualitative look at where the flux is going in each opening angle. The maps show the evolution of Z-averaged, time-averaged, control-normalized X-Y maximal flux at various angles.

Figure 17:
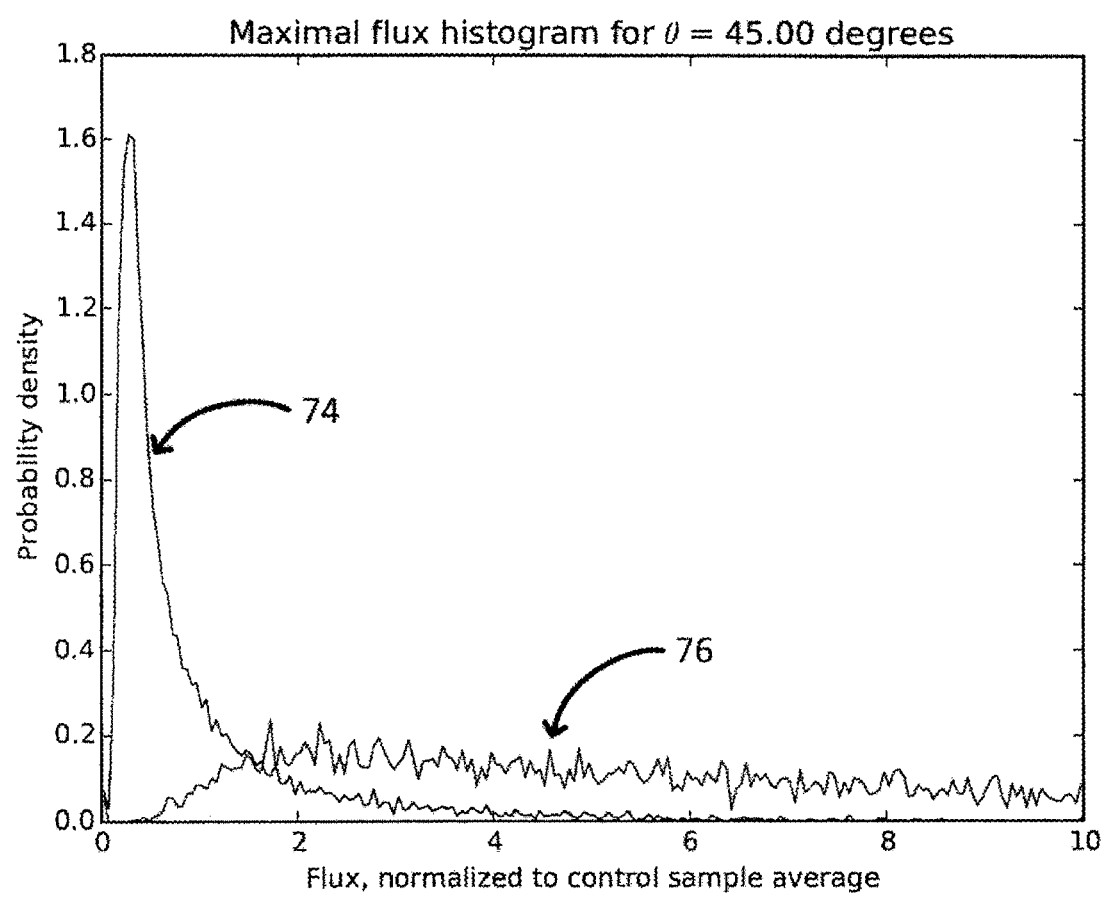
FIG. 17 illustrates a maximum flux histogram for an opening door angle of 45 degrees, according to a simulation of the present invention.
Figure 18:
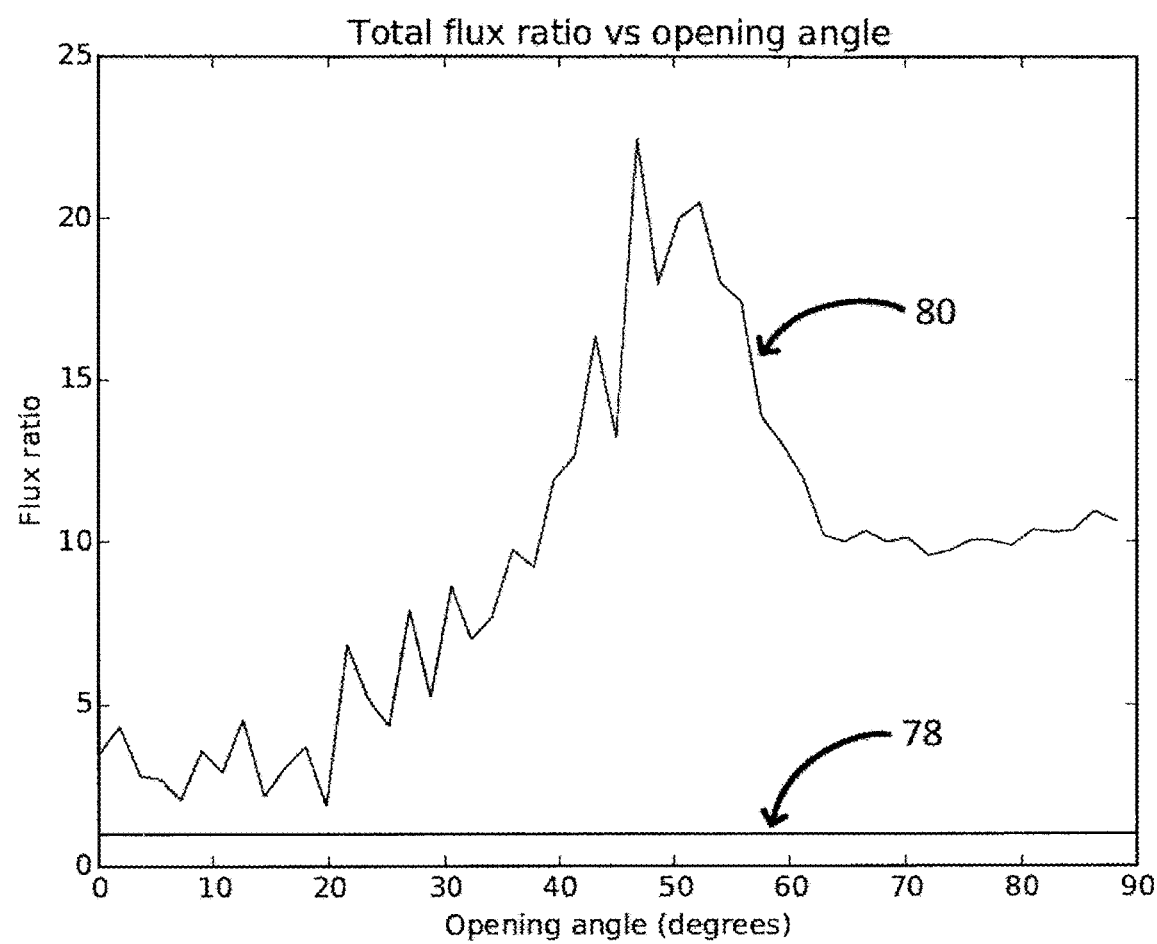
FIG. 18 illustrates a graph of a total flux ratio vs. opening angle of a safe door, according to a simulation of the present invention.

FIG. 17 illustrates a more detailed examination of the results of FIG. 14. In particular, FIG. 17 shows a histogram of flux for all in-chamber pixels for both the model safe simulation and control model. Again, at every opening angle, flux is greater in the model safe simulation than the control. In fact, the total in-chamber flux is greater by at least a factor of 4 across all theta (FIG. 18), with peak values of more than 20. FIG. 18 shows the comparison of in-chamber total time-averaged flux between the model safe simulation and control, across all door opening angles (theta). We observe a clear amplification everywhere in the safe. Line 78 corresponds to a total chamber ratio of 1.0. Line 80 illustrates the total flux ratio of the model safe simulation according to the present invention. Note that all points are above the 1.0 ratio.

To realize a directional flux profile at every point, the simulation employed a regular grid in polar and azimuthal angle, where each radial unit vector is assigned a weighting according to a solid angle of the partition. Then integrate the dot product of every weighted radial vector with the flux vector at every point in the safe chamber. The goal of this calculation is to establish that the model safe delivers more flux to a variety of RFID tag orientations during a door-opening than the static control model.

Figure 19:
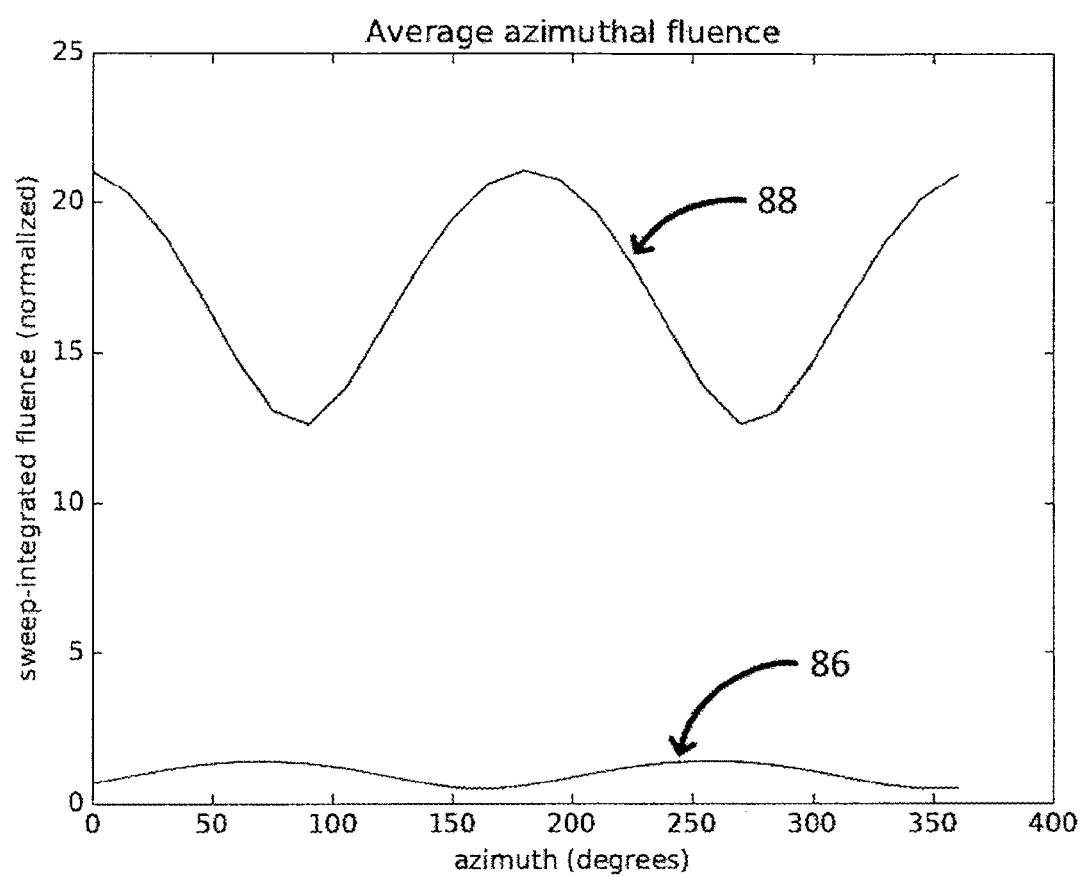
FIG. 19 illustrates a graph of average azimuthal fluence, according to a simulation of the present invention.

FIG. 19 illustrates the results of the calculation. Line 88 represents the polar-averaged, position-averaged azimuthal fluence profile at a door opening angle of 45 degrees of the model safe. Line 86 represents the same for the control test. The model safe a graph of average azimuthal fluence, according to a simulation of the present invention. The fluence units are normalized to the average angular density of fluence for the control test. Note that the control peaks are out of phase with the model safe peaks.

Figure 20:
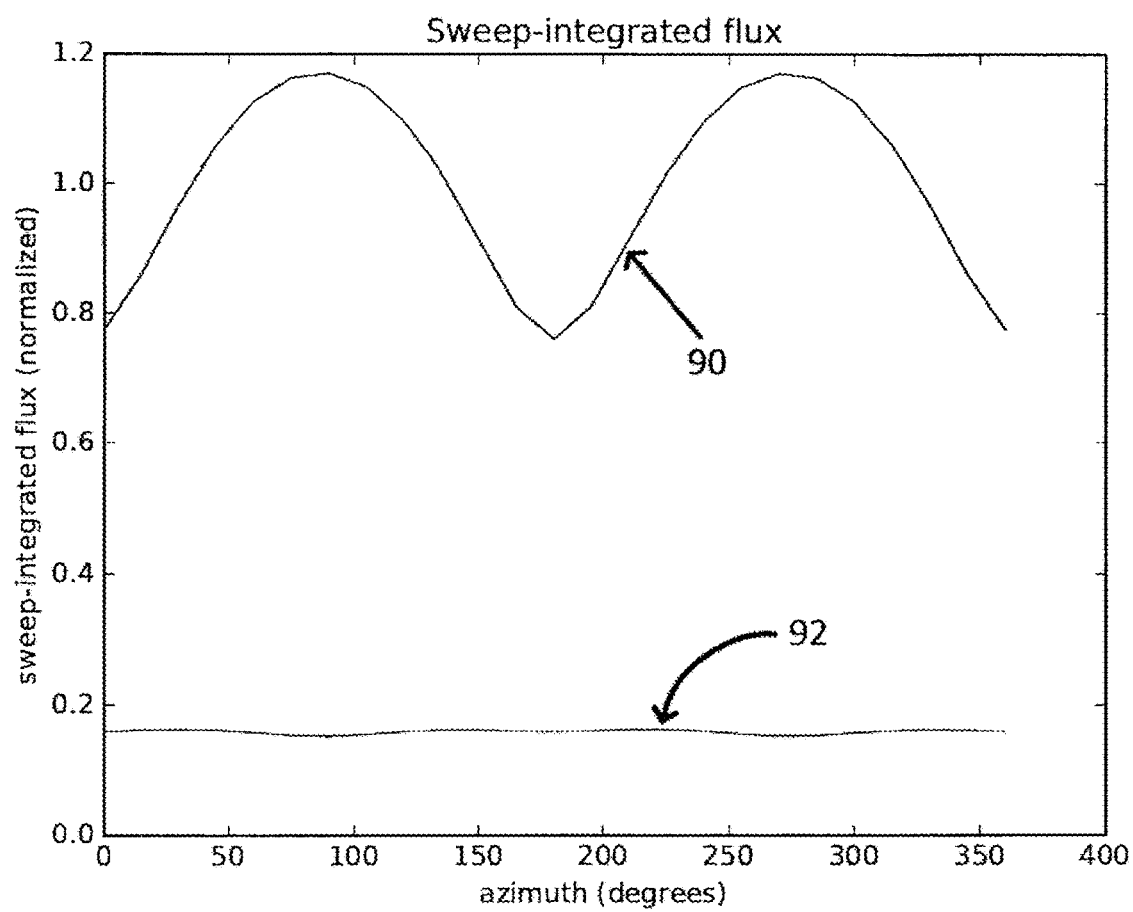
FIG. 20 illustrates a graph of sweep-integrated flux, according to a simulation of the present invention.

The more interesting directional result is found via integration over sweep angle and comparison between the sum of fluxes over model safe geometries at all opening angles (evenly weighted), and the closed-door control geometry. The result of this comparison is shown FIG. 20. Line 90 represents the polar-averaged, position-averaged azimuthal fluence profiles for an extended-time closed-chamber reading. Line 92 represents the polar-averaged position-averaged azimuthal fluence profiles for a swept reading over the same total period. While the swept profile has lower total fluence, it is comparatively smoother, indicating that flux has been distributed more evenly in all directions. Fluence units are normalized to the shut-door average.

Figure 21:
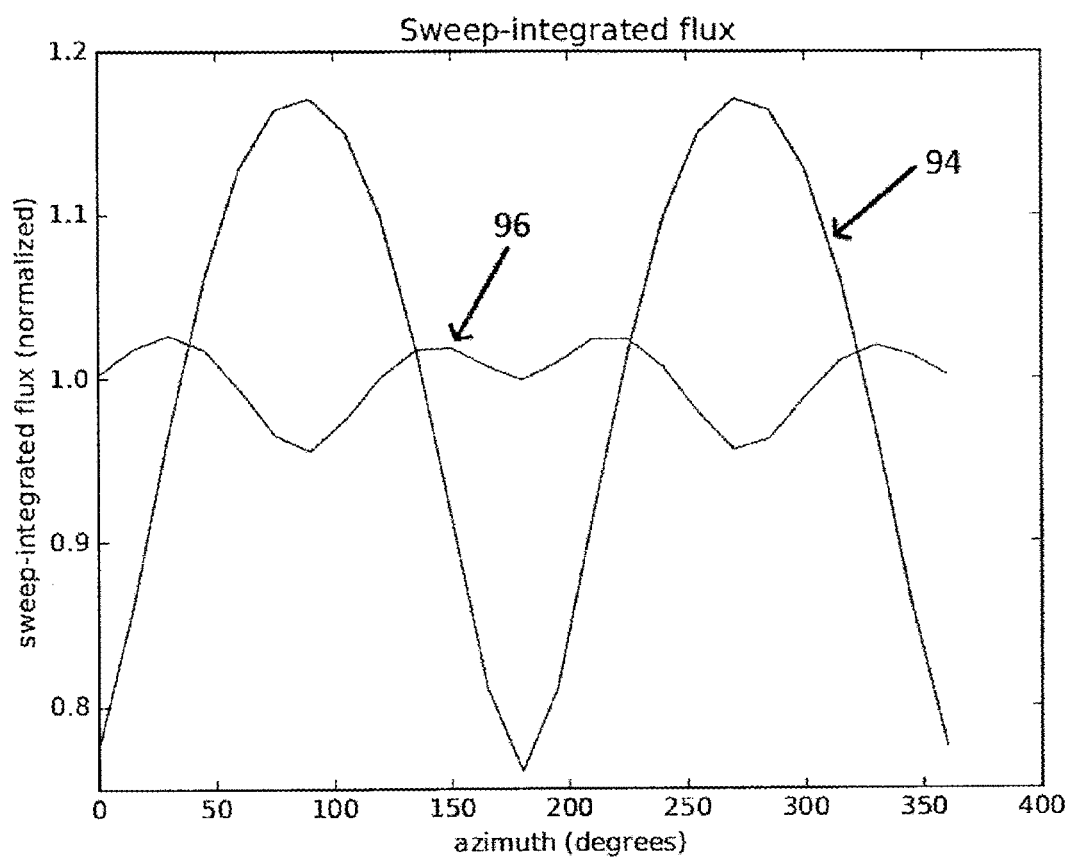
FIG. 21 illustrates a graph of normalized sweep-integrated flux, according to a simulation of the present invention.

The simulation demonstrates that for a reasonably powerful receiver and a reasonable opening speed, flux is delivered more consistently to all angular orientations of RFID tags. FIG. 21 illustrates this result, which uses the same data from FIG. 20 but renormalizes the swept energy units to make visual comparison possible. Line 94 corresponds to line 90 in FIG. 20, and line 96 corresponds to line 92. FIG. 21 illustrates that the opening of the door, and combined reflection inside the safe chamber, leads to an effectively flat angular distribution of flux. This is an advantage over static configurations, with or without the reflective walls of the safe chamber.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

What is claimed is:

1. An RFID safe system, comprising:
  a safe having at least a moveable safe door and a safe chamber with a plurality of inner walls; and
  an RFID system comprising an RFID antenna for emitting an RFID signal to activate at least one RFID tag, and for receiving a reflected signal from an activated RFID tag, and an RFID reader for interpreting data from the signal reflected from the activated RFID tag;
  wherein the RFID antenna is fixed to an inner surface of the safe door, such that, as the safe door opens or closes, the direction of the RFID antenna signals are swept across a geometric plane and are reflected from the inner walls of the safe, thereby increasing the probability of proper alignment of the RFID signal from the antenna with the RFID tag, and increasing the probability of detection of the RFID tag.

2. The RFID safe system of claim 1, wherein the RFID antenna is fixed along a center axis of the inner surface of the safe door.

3. The RFID safe system of claim 1, further comprising a plurality of RFID tags removably fixed to objects intended to be stored in the safe.

4. The RFID safe system of claim 1, further comprising a plurality of RFID antennas fixed to the inner surface of the safe door.

5. The RFID safe system of claim 1, wherein the RFID reader is integrated with the RFID antenna.

6. The RFID safe system of claim 1, wherein the RFID reader is located outside of the safe.

7. An RFID safe system, comprising:
  a safe having at least a moveable safe door and a safe chamber with a plurality of inner walls; and
  an RFID system comprising an RFID antenna for emitting an RFID signal to activate at least one RFID tag, and for receiving a reflected signal from an activated RFID tag, and an RFID reader for interpreting data from the signal reflected from the activated RFID tag;
  wherein the RFID antenna is fixed to an inner surface of the safe, such that, as the safe door opens or closes, the direction of the RFID antenna signals are swept across a geometric plane and are reflected from the inner walls of the safe, thereby increasing the probability of proper alignment of the RFID signal from the antenna with the RFID tag, and increasing the probability of detection of the RFID tag.

8. The RFID safe system of claim 7, further comprising a plurality of RFID antennas fixed to a plurality of inner chamber surfaces of the safe chamber.

9. The RFID safe system of claim 7, wherein the RFID reader is integrated with the RFID antenna.

10. The RFID safe system of claim 7, wherein the RFID reader is located outside of the safe.

* * * * *